Figures 1, 2:
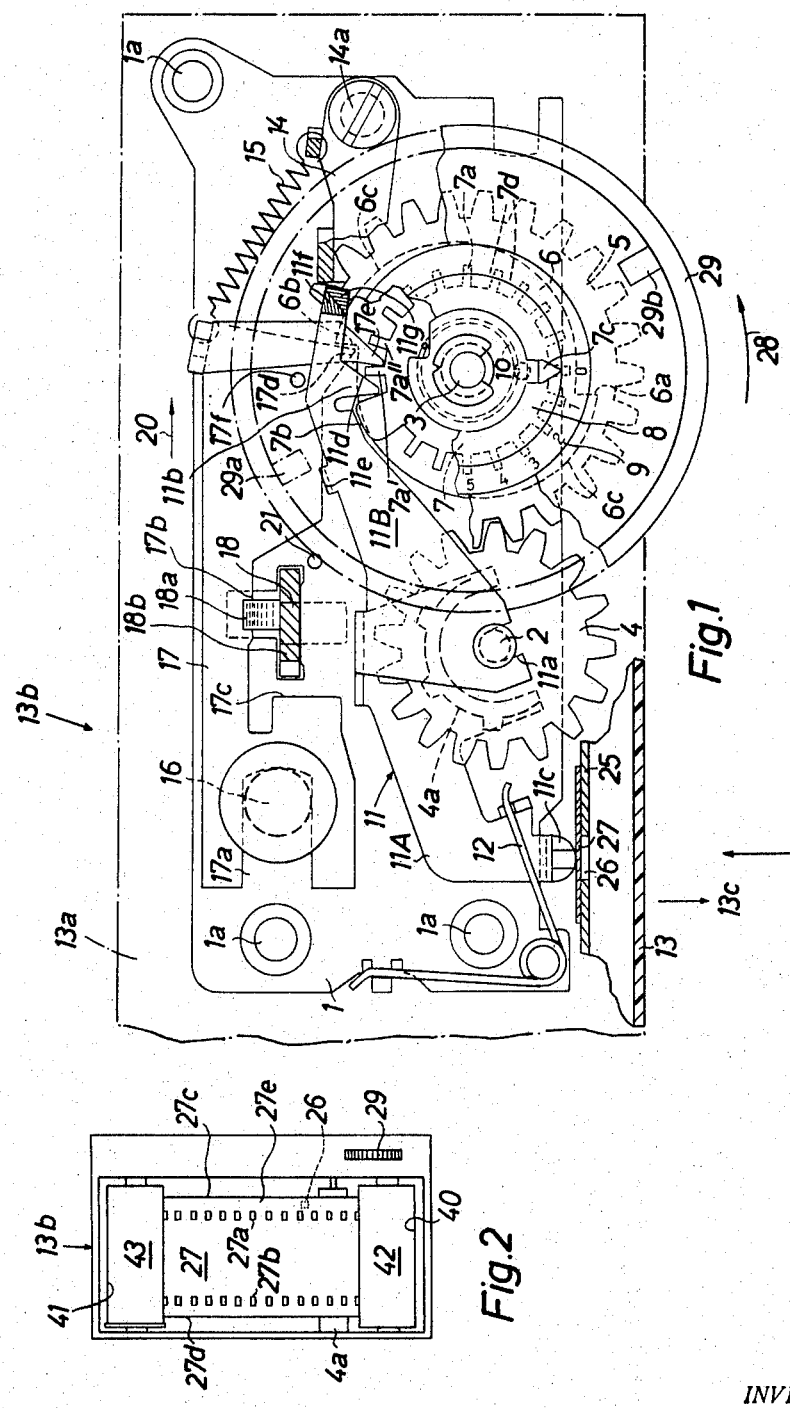

INVENTOR.
FERDINAND WAGNER
ALFRED WINKLER
HEINZ ERNST

United States Patent Office 3,363,528
Patented Jan. 16, 1968

3,363,528
AUTOMATIC FRAME COUNTER FOR
CAMERAS
Alfred Winkler, Ferdinand Wagner, and Heinz Ernst,
Munich, Germany, assignors to Agfa-Gevaert Aktiengesellschaft, Leverkusen, Germany
Filed July 15, 1965, Ser. No. 472,222
Claims priority, application Germany, July 23, 1964,
A 46,660
19 Claims. (Cl. 95—31)

The present invention relates to photographic cameras in general, and more particularly to an improved film frame counter for cameras. Still more particularly, the invention relates to improvements in frame counters of the type wherein an indicator is automatically reset to starting position in response to opening of the camera housing preparatory to removal of an exposed film.

It is already known to provide a camera with a film frame counter which includes a scale or another type of indicator to allow for visual determination of the total number of completed exposures or of the total number of still unexposed film frames. It is also known to construct the frame counter in such a way that the indicator automatically returns to starting position in response to opening of the housing in order to afford access to a fully exposed film. A serious drawback of such conventional frame counters is that they will furnish false information if the user forgets to insert a fresh film into the housing, i.e., if the user properly closes the removable or pivotable wall of the housing but fails to insert a fresh film cartridge or magazine. The frame counter will be set in operation in response to each release of the shutter mechanism or in response to each actuation of the film transporting device, and an absentminded user is likely to continue taking "pictures" without receiving a warning that there is no film in the camera.

Accordingly, it is an important object of the present invention to provide a novel and improved film frame counter which is constructed and assembled in such a way that its indicator will be set in motion only when a fresh film is properly inserted into the camera.

Another object of the invention is to provide a frame counter whose indicator is automatically reset to starting position when the user removes or otherwise displaces a portion of the housing in order to gain access to the exposed film, and which prevents release of the shutter mechanism and/or diaphragm mechanism until and unless a fresh film is properly inserted and treaded into the transporting device of the camera.

An additional object of the invention is to provide a frame counter of the above outlined characteristics which is provided with means for permitting immediate visual determination of the presence or absence of a film in the camera.

Still another object of the invention is to provide an automatic film counter which prevents operation of the film-transporting device when there is no film in the camera.

A concomitant object of the invention is to provide a film counter which is set in operative position by a properly inserted film and wherein such additional function of the film does not result in scratching of the photosensitive surface or in reduced quality of exposures.

A further object of the invention is to provide a novel operative connection between the film transporting device and the improved film counter.

An additional object of the invention is to provide a very compact, lightweight and rugged film frame counter which adds little to the bulk and/or weight of the camera.

Briefly stated, our invention resides in the provision of a camera which comprises a housing defining film-accommodating chamber means and including a wall which is movable between open and closed positions to respectively afford and prevent access to the chamber means, film transporting means engageable with and arranged to advance a properly inserted film through distances corresponding to the length of a film frame, and a frame counter which automatically indicates the number of exposures or the number of unexposed film frames.

In accordance with an important feature of the present invention, the frame counter comprises a disk- or wheel-shaped indicator which is movable from a starting position to a plurality of additional positions each of which is indicative of a different number of exposures, resilient means for automatically returning the indicator to starting position in response to movement of the wall to open position, motion transmitting means preferably including a slidable and rockable bolt which is normally engaged with the transporting means and is then operative to move the indicator from starting position to consecutive additional positions on repeated operation of the transporting means, movable control means preferably comprising a two-armed lever which is biased by a spring and normally tends to disengage the motion transmitting means from the transporting means, and guide means provided on the wall and arranged to support a portion of properly inserted film in such position that, on movement of the wall to closed position, such film portion prevents the control means from disengaging the motion transmitting means from the transporting means. Thus, the film itself serves as a means to maintain the motion transmitting means in engagement with the transporting means whereby the indicator is moved from starting position to consecutive additional positions only at such times when the housing actually accommodates a properly inserted film.

In accordance with another feature of our invention, the film transporting means is automatically arrested and cannot move in a sense to transport the film when the control means is not engaged by film. Also, the control means may be provided with markers which are visible through a window provided in the housing to indicate whether or not the housing accommodates a film. Finally, the motion transmitting means may be arranged to automatically block a release trigger for the shutter mechanism and/or diaphragm mechanism when there is no film in the housing.

The novel features which are considered as characteristic of the invention are set forth in particular in the appended claims. The improved film frame counter itself, however, both as to its construction and its mode of operation, together with additional features and advantages thereof, will be best understood upon perusal of the following detailed description of a specific embodiment with reference to the accompanying drawings, in which:

FIG. 1 is an enlarged fragmentary top plan view of a still camera which embodies the improved frame counter, certain elements of the frame counter and of the film transporting device being shown partly in section and in part broken away; and FIG. 2 is a smaller-scale diagrammatic rear elevational view of the camera, as seen in the direction indicated in FIG. 1 by an arrow II, and with the rear wall of the housing removed.

Referring to FIG. 1 there is shown a still camera comprising a housing 13b having a horizontally extending intermediate wall or partition 13a which carries a mounting plate or support 1. The mounting plate 1 is formed with eyelets 1a for passage of screws or rivets (not shown) which secure it to the partition 13a, and this mounting plate serves as a bearing for two vertical shafts 2 and 3. The shaft 2 carries a pinion 4 which is coupled to a film advancing sprocket 4a and which may be rotated in response to turning of a wheel-shaped rotary actuating member 29. The actuating member 29 may also serve to cock the shutter mechanism of the camera.

The pinion 4 meshes with a gear 5 which is mounted on the shaft 3 and is coupled with a disk-shaped cam 6 having two angularly spaced lobes 6a, 6b. The radial faces of the lobes 6a, 6b are located diametrically opposite each other. The gear 5 is coaxial with but is rotatable with reference to a disk-shaped film frame indicator 7 which is rotatable on the shaft 3 and carries a number of relatively short and narrow teeth 7a and a single relatively long and wide tooth 7b. The indicator 7 carries an index 7c which is located behind an annular window 8 and cooperates with a fixed annular scale 9 whose graduations indicate the number of exposed film frames or the number of unexposed frames. A torsion spring 10 is coupled to the indicator 7 and to the housing 13b, and its purpose is to automatically return the indicator to a starting position in which the large tooth 7b engages with the pawl 11b of a control level 11, such return movement of the indicator 7 to starting position being possible when the user moves a rear wall 13 with reference to the remainder to the housing 13b and into an open position in which the rear wall 13 affords access to the film 27.

The control lever 11 comprises two arms 11a and 11b and is floatingly supported by the mounting plate 1 and shaft 2. The arm 11B is nearer to the observer of FIG. 1 than the arm 11A and is provided with an open slot 11a which receives the top portion of the shaft 2 so that the control lever 11 may be rocked about and is also movable radially with reference to the shaft 2. The arm 11A is biased by a torsion spring 12 which is installed on the mounting plate 1 and tends to rock the control lever 11 in a counterclockwise direction, as viewed in FIG. 1. When the rear wall 13 is moved to open position (see the arrow 13c), the spring 12 will rock the control lever 11 to such an extent that the pawl 11b of the arm 11B moves radially outwardly and beyond the top lands of shorter teeth 7a on the indicator 7. Therefore, the spring 10 is free to rotate the indicator 7 back to the aforementioned starting position in which the pawl 11b engages the longer tooth 7b. If the wall 13 is thereupon returned to the closed position of FIG. 1, the control lever 11 is rocked in a clockwise direction and its pawl 11b moves toward but still remains in a zone located radially outwardly of the nearest short tooth 7a, i.e., the frame counter is still inoperative. This is due to the fact that the inner side of the rear wall 13 supports a film guide here shown as a pressing plate 25 which is provided with a cutout or recess 26, and this recess 26 receives an end portion or pallet 11c of the arm 11a when the wall 13 returns to the closed position of FIG. 1. The recess 26 is dimensioned in such a way that, though the pressing plate 25 might bring about some angular displacement of the control lever 11 in a clockwise direction, such angular movement is insufficient to bring the pawl 11b into a tooth space 7d at the one or the other flank of the nearest short tooth 7a.

However, when the user inserts a fresh film 27 and brings the perforations of this film into proper engagement with the teeth of the sprocket 4a, the film will prevent entry of the pallet 11c into the recess 26 whereby the control lever 11 is rocked through such an angle that its pawl 11b enters the nearest tooth space 7d. The purpose of the pressing plate 25 is to keep the film 27 in proper engagement with the teeth of the sprocket 4a when the rear wall 13 is returned to the closed position of FIG. 1. At the same time, the pressing plate 25 holds an unexposed frame of the film 27 in a flat plane and in registry with the objective to make sure that the camera will expose an absolutely flat section of the film.

The control lever 11 automatically arrests the indicator 7 in starting position because, even though the rear wall 13 is moved to open position, the spring 12 can only rock this control lever to such an extent that the pawl 11b moves away from the shorter teeth 7a but not from the path of the longer tooth 7b. When the film 27 overlies the recess 26 and prevents entry of the pallet 11c into this recess, the pawl 11b automatically enters the nearest tooth space 7d and places the frame counter into operative position in a manner as will be fully described hereinafter. If the pinion 4 is then rotated in response to turning of the actuating member 29, i.e., while the gear 5 turns in a counterclockwise direction as indicated by an arrow 28, the nearest short tooth 7a' bears against an inclined face 11d of the pawl 11b to rock the control lever 11 in a counterclockwise direction until the pawl 11b enters the next tooth space 7d. The pawl 11b then holds the indicator 7 against rotation back to starting position under the bias of the spring 10 unless, of course, the user decides to move the rear wall 13 to open position (arrow 13c).

The frame counter further comprises a pawl 14 which is biased by a helical spring 15 in a counterclockwise direction, as viewed in FIG. 1, so that its nose engages the teeth of the gear 5 and prevents rotation of this gear in a clockwise direction. When the gear 5 rotates in a counterclockwise direction (arrow 28), the nose of the pawl 14 merely rides over the teeth of the gear 5. In other words, the gear 5 can rotate only when the actuating member 29 turns in a counterclockwise direction. The pawl 14 is turnable on a shaft 14a which is supported by the mounting plate 1.

The mounting plate 1 further carries a shaft 16 which extends into an open slot 17a provided in the left-hand end portion of a reciprocable flat plate-like motion transmitting bolt 17. The right-hand portion of the motion transmitting bolt 17 is attached to the spring 15 so that the latter tends to shift the bolt in a direction to the right, as viewed in FIG. 1. The bolt 17 is provided with a camming edge 17b and with a locking edge 17c both of which cooperate with a spring biased release trigger 18 for the shutter mechanism. Still further, the bolt 17 includes a cam follower 17d and a motion transmitting nose 17e. The release trigger 18 comprises an inclined portion 18a and a projection or lug 18b. A stop pin 21 is provided on the mounting plate 1 to limit the movement of the bolt 17 in a direction to the left, as viewed in FIG. 1.

The elements 4, 4a, 5, 6 and 29 form part of the film transporting device, and the elements 7, 8, 9, 10, 11, 12, 15, 16, 17 and 25 constitute the main components of the frame counter.

The structure of FIG. 1 is operated as follows:

If the user depresses the release trigger 18 in a direction toward the mounting plate 1, the inclined portion 18a of the trigger will engage the camming edge 17b and will cause the motion transmitting bolt 17 to turn about the shaft 16 in a counterclockwise direction, as viewed in FIG. 1. The follower 17d of the bolt 17 is then moved radially outwardly and away from the lobe 6b on the cam 6 so as to abut against one of two arcuate peripheral cam faces 6c of this cam. At the same time, the motion transmitting nose 17e moves away from engagement with the adjoining tooth 7a' on the indicator 7. As soon as the follower 17d and the motion transmitting nose 17e are respectively disengaged from the lobe 6b of the cam 6 and from the teeth 7a of the indicator 7, the bolt 17 is free to follow the bias of the spring 15 and moves in a direction to the right as indicated in FIG. 1 by an arrow 20. This moves the locking edge 17c over the lug 18b and prevents the release trigger 18 from returning to its normal position, i.e., the trigger cannot be depressed again before the film transporting device including the sprocket 4a and the actuating member 29 has advanced the film 27 by the length of a frame. Due to such longitudinal displacement of the bolt 17 under the bias of the spring 15, the motion transmitting nose 17e cannot reengage the same short tooth (7a') as before even after the trigger 18 is free to reassume its normal position.

The user then turns the actuating member 29 to rotate the gear 5 (arrow 28). The actuating member 29 turns the gear 5 in a counterclockwise direction which results in a clockwise rotation of the pinion 4 and sprocket 4a. The diameter of the actuating member 29 is such that a portion thereof extends beyond the outline of the housing 13b in order to facilitate rotation of this member by hand. The sprocket 4a transports the film 27 by the length of a frame and the actuating member 29 simultaneously rotates the cam 6 whereby the follower 17d slides along the adjoining arcuate peripheral cam face 6c and finally engages the radial face of the lobe 6a. While the follower 17d tracks the adjoining cam face 6c, the bolt 17 rocks gradually in a clockwise direction and comes to a halt when the follower 17d engages the radial face of the lobe 6a. The motion transmitting nose 17e then already engages the next short tooth 7a'' of the indicator 7. As the actuating member 29 continues to turn the cam 6, the radial face of the lobe 6a bears against the follower 17d and shifts the bolt 17 in a direction to the left, i.e., counter to the direction indicated by the arrow 20 and into abutment with the fixed stop 21. Such movement of the bolt 17 causes the locking edge 17c to move away from the lug 18b so that the release trigger 18 is free to follow the bias of its spring and returns to its normal position. Since the motion transmitting nose 17e already engages the next short tooth 7a'' of the indicator 7, the indicator turns in response to movement of the bolt 17 toward the stop 21 and the index 7c is moved into registry with the next graduation on the scale 9. The spring 10 is automatically deformed and stores energy when the indicator 7 is turned by the motion transmitting nose 17e of the bolt 17, i.e., when the latter moves toward the stop 21. The control lever 11 moves in the previously described manner and prevents return rotation of the indicator 7 because its pawl 11b engages the nearest short tooth 7a'.

The same procedure is repeated in response to each consecutive depression of the release trigger 18 whereby the index 7c travels behind the window 8 and pinpoints consecutive graduations on the scale 9 each of which corresponds to a different angular position of the indicator 7. Thus, the indicator 7 is movable by the bolt 17 from a starting position in which the pawl 11b of the control lever 11 engages the long tooth 7b to a plurality of additional positions each of which indicates a different number of exposures, or a different number of unexposed frames.

When the user exposes the last frame of the film 27, the motion transmitting nose 17e of the bolt 17 engages the long tooth 7b. Therefore, the nose 17e cannot turn the indicator 7 and the index 7c remains in registry with the last graduation on the scale 9. The length of the tooth 7b is preferably such that this tooth also keeps the follower 17c away from the lobes 6a, 6b on the cam 6 which means that, after the last exposure, the locking edge 17c continues to overlie the lug 18b of the release trigger 18 and the latter thus remains in depressed position, i.e., the user cannot actuate the trigger 18 until the exposed film 27 is removed from the housing 13b.

The user then continues to turn the actuating member 29 in a sense to transport the film via pinion 4 and sprocket 4a until the entire film is received in the take-up cartridge. Alternatively, the film transporting device may be such that, once the motion transmitting nose 17e engages the long tooth 7b of the indicator 7, the film 27 may be transported in the opposite direction and back into the supply cartridge.

In the next step, the user moves the rear wall 13 to open position whereby the wall 13 affords access to the film 27. During such movement of the rear wall 13 to open position (arrow 13c), the control lever 11 is rocked by the spring 12 and turns in a counterclockwise direction, as viewed in FIG. 1, whereby its arm 11B strikes against a pin 17f on the bolt 17 to keep the blocking bolt in disengaged position, i.e., away from engagement with the cam 6 and with the indicator 7. Consequently, the indicator 7 can turn under the bias of the spring 10 and returns its index 7c into registry with the first graduation on the scale 9. Since the rear wall 13 has been moved to open position, the user can insert a fresh film 27 and can place the leading end of the film over the sprocket 4a so that the teeth of this sprocket enter the nearest perforation or perforations. Also, the user attaches the tip of the film to the spool of the take-up cartridge unless, of course, the structure of FIG. 1 is embodied in a camera wherein the leading end of the film is automatically treaded into the take-up cartridge in response to operation of the film transporting device as long as the film is placed over the sprocket 4a. When the rear wall 13 thereupon reassumes the closed position of FIG. 1, all of the remaining components also return to the positoins shown in this illustration.

The heretofore described parts of the improved camera insure that the film counter remains inoperative if the user closes the rear wall 13 without inserting a fresh film. This is due to the fact that the bolt 17 is then disengaged from the cam 6 of the film transporting device and cannot turn the indicator 7 in response to rotation of the actuating member 29. Also, if the user happens to forget that a fresh film should be inserted prior to closing of the wall 13, the film counter will not operate on subsequent depression or depressions of the release trigger 18. This means that, by looking at the position of the index 7c, the user will immediately detect the absence of the film because the index 7c remains in the same starting position.

In order to provide a more readily detectable indication that there is no film in the camera while the rear wall 13 is held in closed position, we prefer to provide the camera of FIG. 1 with an arrangement which prevents the turning of the actuating member 29 and/or the depression of the release trigger 18 until and unless a film is actually received in the housing 13b. This can be achieved by providing the control lever 11 with a projection 11e and by providing the actuating member 29 with two radially inwardly extending projections 29a, 29b. The projections 29a, 29b are located diametrically opposite each other and each thereof may move into engagement with the projection 11e when the pallet 11c of the arm 11A extends into the recess 26, i.e., when there is no film in the camera. However, the projections 29a, 29b will bypass the projection 11e when the film 27 prevents entry of the pallet 11c into the recess 26. Another advantage of the projections 11e, 29a, 29b is that they will indicate to the user when an exposed film is fully accommodated in the take-up cartridge because, as soon as the trailing end of the film 27 passes beyond the recess 26, the pallet 11c can enter this recess and, on further rotation of the actuating member 29, one of the projections 29a, 29b will strike against the projection 11e to prevent further rotation of the actuating member.

When the rear wall 13 is moved to open position and the user rotates the actuating member 29, the pallet 11c is free to move even beyond a position corresponding to its position during entry into the recess 26 so that at such time, again, the projection 11e extends into the path of the projections 29a, 29b. Since a rotation of the actuating member 29 through angle of 180 degrees does not suffice to advance the film 27 by the full length of a frame, the projection 29a or 29b will engage the projection 11e before the indicator 7 can turn at the time the actuating member 29 rotates while the rear wall 13 is open. In other words, the projections 29a, 29b can bypass the projection 11e only and alone when the camera accommodates a film and when such film overlies the recess 26 to prevent entry of the pallet 11c. The locking edge 17c automatically prevents return movement of the release trigger 18 to starting position when the pallet 11c is free to enter the recess 26.

It will be seen that the cam 6 actually constitutes a coupling between the motion transmitting bolt 17 of the film counter and the actuating member 29 of the transporting mechanism, and that the control level 11 will disengage the follower 17d of the bolt 17 from the cam 6 when its end portion or pallet 11c is allowed to enter the recess 26 of the pressing plate 25. This prevents the motion transmitting nose 17e from turning the indicator 7 when there is no film in the housing 13b. This also holds true when the rear wall 13b is moved to open position because the arm 11B then also bears against the pin 17f and disengages the follower 17d from the cam 6. The bias of the torsion spring 12 is stronger than the bias of the helical spring 15.

The arm 11B of the control lever 11 carries two markers or points 11f, 11g which may be respectively colored red and green. The top wall of the housing 13b is provided with a second window (not shown) which registers with the marker 11f or 11g. In the position shown in FIG. 1, the green marker 11f will register with the second window to give to the user a "green light," meaning that the camera contains film. When the rear wall 13 is moved to open position or when the pallet 11c is free to enter the recess 26 of the pressing plate 25, the second window registers with the red marker 11g, thus indicating to the user that the housing 13b is open or that the camera does not contain any film. In other words, the user then notes the "red light" and is warned that a film must be inserted prior to next depression of the release trigger 18.

It is clear that the markers 11f, 11g may be replaced by other symbols, for example, by numerals or letters. Thus, a letter "F" replacing the marker 11f could indicate that the camera contains film and a letter "O" could replace the marker 11g to indicate that the supply of film in the camera is zero.

FIG. 2 shows a portion of the film 27 and the two rows of perforations 27a, 27b along the longitudinal edges of the film. The surfaces surrounding these perforations are engaged by the teeth of the sprocket 4a when the film 27 extends along the inner side of the pressing plate 25 and when the wall 13 assumes its closed position. The recess 26 (shown by broken lines) is preferably located behind that zone of the film 27 which extends between one row of perforations 27a, 27b and the adjoining longitudinal edge 27c or 27d. FIG. 2 shows that the recess 26 is located behind the zone 27e between the row of perforations 27a and the edge 27c. Thus, the pallet 11c cannot scratch that portion of the film which extends between the two rows of perforations, and the pallet 11c cannot enter any of the perforations when the film is properly inserted into the housing 13b. In other words, the recess 26 should not be aligned with the rows of perforations 27a or 27b because the pallet 11c would then enter such perforations and could eventually enter the recess. The pallet 11c is preferably closely adjacent to the sprocket 4a, and this sprocket is located between a first chamber 40 which is provided in the housing 13b to receive a film supply cartridge 42, and a second chamber 41 which is also provided in the housing 13b and receives a take-up cartridge 43. The chambers 40 and 41 are accessible upon movement of the rear wall 13 to open position. In a camera in which the film transporting device automatically couples the leading end of the film to the take-up cartridge 43, the sprocket 4a is preferably immediately adjacent to the chamber 40 so that it can engage and entrain the leading end of a film which extends only slightly from the supply cartridge 42.

The number of projections (29a, 29b) on the actuating member 29 normally corresponds to the number of film frames which are advanced in response to a full revolution of the member 29.

It is clear that the improved film frame counter can be modified in a number of ways without departing from the spirit of our invention. For example, the cam 6 may be provided with three or more lobes and the actuating member 29 may be provided with three or more projections, depending on the extent to which this actuating member must be turned by hand in order to advance the film 27 by the length of a frame. Furthermore, the index 7c may be provided on a stationary part of the housing 13b and the scale 9 is then connected to and rotates with the indicator 7. Also, the gear train including the pinion 4 and gear 5 may include one or more intermediate gears, depending on the desired transmission ratio of the gear train. The trigger 18 may also serve to release an automatic exposure control, for example, an exposure control of the type which include a photoelectric cell or a photoelectric resistor and which will select the size of the diaphragm opening as a function of the intensity of light coming from a viewed scene or subject. The actuating member 29 may further serve as a means for cocking the shutter mechanism and/or the diaphragm mechanism.

The recess 26 can be provided on a part of the rear wall 13 other than the pressing plate 25, as long as this recess is not accessible to the pallet 11c when the film 27 is properly inserted.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be secured by Letters Patent is:

1. In a camera, a housing defining film-accommodating chamber means and including a wall movable between open and closed positions to respectively afford and prevent access to said chamber means; film transporting means engageable with and arranged to advance a properly inserted film through distances corresponding to the length of a film frame; and a frame counter including an indicator movable from a starting position to a plurality of additional positions each of which is indicative of a different number of exposures, means for returning said indicator to starting position in response to movement of said wall to open position, motion transmitting means normally engaged with said transporting means and operative to move said indicator from starting position to consecutive additional positions on repeated operation of said transporting means, movable control means normally tending to disengage said motion transmitting means from said transporting means, and guide means provided on said wall and arranged to support a portion of properly inserted film in such position that, on movement of said wall to closed position, such film portion prevents said control means from disengaging said motion transmitting means from said transporting means.

2. In a camera, a housing defining film-accommodating chamber means and including a wall movable between open and closed positions to respectively afford and prevent access to said chamber means; film transporting means engageable with and arranged to advance a properly inserted film through distances corresponding to the length of a film frame; and a frame counter including an indicator movable from a starting position to a plurality of additional positions each of which is indicative of a different number of exposures, means for returning said indicator to starting positions in response to movement of said wall to open position, motion transmitting means normally engaged with said transporting means and operative to move said indicator from starting position to consecutive additional positions on repeated operation of said transporting means, movable control means normally tending to disengage said motion transmitting means from said transporting means and having an end portion, and guide means provided on said wall and having a recess receiving said end portion of the control means when said wall is closed and there is no film in said chamber means whereby said control means disengages said motion transmitting means from said transporting means, said guide means being arranged to support a portion of properly inserted film in such position that the film prevents entry of said end portion into said recess whereby, on movement of said wall to closed position, such film portion prevents said control means from disengaging said motion transmitting means from said transporting means.

3. In a camera, a housing defining film-accommodating chamber means and including a wall movable between open and closed positions to respectively afford and prevent access to said chamber means; film transporting means engageable with and arranged to advance a properly inserted film through distances corresponding to the length of a film frame, said transporting means comprising a rotary actuating member having at least one first projection; and a frame counter including an indicator movable from a starting position to a plurality of additional positions each of which is indicative of a different number of exposures, means for returning said indicator to starting position in response to movement of said wall to open position, motion transmitting means normally engaged with said transporting means and operative to move said indicator from starting position to consecutive additional positions on repeated operation of said transporting means, movable control means normally tending to disengage said motion transmitting means from said transporting means, said control means having a second projection extendable into and from the path of said first projection, and guide means provided on said wall and arranged to support a portion of properly inserted film in such position that, on movement of said wall to closed position, such film portion prevents said control means from disengaging said motion transmitting means from said transporting means and maintains said second projection out of the path of said first projection.

4. In a camera, a housing defining film-accommodating chamber means and including a wall movable between open and closed positions to respectively afford and prevent access to said chamber means; film transporting means engageable with and arranged to advance a properly inserted film through distances corresponding to the length of a film frame, said transporting means comprising a rotary film advancing member; and a frame counter including an indicator movable from a starting position to a plurality of additional positions each of which is indicative of a different number of exposures, means for returning said indicator to starting position in response to movement of said wall to open position, motion transmitting means normally engaged with said transporting means and operative to move said indicator from starting position to consecutive additional positions on repeated operation of said transporting means, movable control means normally tending to disengage said motion transmitting means from said transporting means and having an end portion immediately adjacent to said advancing member, and guide means provided on said wall and having a recess receiving said end portion of the control means when said wall is closed and there is no film in said housing whereby said control means disengages said motion transmitting means from said transporting means, said guide means being arranged to support a portion of properly inserted film in such position that the film prevents entry of said end portion into said recess whereby, on movement of said wall to closed position, such film portion prevents said control means from disengaging said motion transmitting means from said transporting means.

5. A structure as set forth in claim 4, wherein said chamber means accommodates a film supply cartridge and a take-up cartridge, said cartridges being located at the opposite sides of said advancing member and said end portion being located between said advancing member and one of said cartridges.

6. In a camera of the type for use with roll film having at least one row of perforations adjacent to but spaced from one longitudinal edge thereof, a housing defining film-accommodating chamber means and including a wall movable between open and closed positions to respectively afford and prevent access to said chamber means; film transporting means engageable with the perforations of and arranged to advance a properly inserted film through distances corresponding to the length of a film frame; and a film counter including an indicator movable from a starting position to a plurality of additonal positions each of which is indicative of a different number of exposures, means for returning said indicator to starting position of movement of said wall to open position, motion transmitting means normally engaged with said transporting means and operative to move said indicator from starting position to consecutive additional positions on repeated operation of said transporting means, movable control means normally tending to disengage said motion transmitting means from said transporting means, said control means having an end portion, and guide means provided on said wall and having a recess receiving said end portion of the control means when said wall is moved to closed position and there is no film in said chamber means whereby said control means disengages said motion transmitting means from said transporting means, said guide means being arranged to support a portion of properly inserted film in such position that the film prevents entry of said end portion into said recess whereby, on movement of said wall to closed position, such film portion prevents said control means from disengaging said motion transmitting means from said transporting means, said recess being located between the row of perforations and the adjoining longitudinal edge of the properly inserted film.

7. In a camera, a housing defining film-accommodating chamber means and including a wall movable between open and closed positions to respectively afford and prevent access to said chamber means; film transporting means engageable with and arranged to advance a properly inserted film through distances corresponding to the length of a film frame, said transporting means including a rotary actuating member arranged to advance a predetermined number of film frames in response to a full revolution thereof and comprising angularly spaced first projections whose combined number equals said predetermined number; and a frame counter including an indicator movable from a starting position to a plurality of additional positions each of which is indicative of a different number of exposures, means for returning said indicator to starting position in response to movement of said wall to open position, motion transmitting means normally engaged with said transporting means and operative to move said indicator from starting position to consecutive additional positions on repeated operation of said transporting means, movable control means normally tending to disengage said motion transmitting means from said transporting means, said control means having a second projection movable into and from the path of said first projections, and guide means provided on said wall and arranged to support a portion of properly inserted film in such position that, on movement of said wall to closed position, such film portion prevents said control means from disengaging said motion transmitting means from said transporting means and maintains said second projection out of the path of said first projections.

8. In a camera, a housing defining film-accommodating chamber means and including a wall movable between open and closed positions to respectively afford and prevent access to said chamber means; film transporting means engageable with and arranged to advance a properly inserted film through distances corresponding to the length of a film frame; and a frame counter including an indicator movable from a starting position to a plurality of additonal positions each of which is indicative of a different number of exposures, means for returning said indicator to starting position in response to movement of said wall to open position, motion transmitting means normally engaged with said transporting means and operative to move said indicator from starting position to consecutive additional positions on repeated operation of said transporting means, movable control means normally tending to disengage said motion transmitting means from said transporting means, guide means provided on said wall and arranged to support a portion of properly inserted film in such position that, on movement of said wall to closed position, such film portion prevents said control means from disengaging said motion transmitting means from said transporting means, and marker means provided on said control means and exposed to the eye of the user only when the position of said control means indicates the presence of film in said chamber means.

9. In a camera, a housing defining film-accommodating chamber means and including a wall movable between open and closed positions to respectively afford and prevent access to said chamber means; film transporting means engageable with and arranged to advance a properly inserted film through distances corresponding to the length of a film frame; and a frame counter including an indicator movable from a starting position to a plurality of additional positions each of which is indicative of a different number of exposures, means for returning said indicator to starting position in response to movement of said wall to open position, motion transmitting means normally engaged with said transporting means and operative to move said indicator from starting position to consecutive additional positions on repeated operation of said transporting means, movable control means normally tending to disengage said motion transmitting means from said transporting means, guide means provided on said wall and arranged to support a portion of properly inserted film in such position that, on movement of said wall to closed position, such film portion prevents said control means from disengaging said motion transmitting means from said transporting means, and marker means provided on said control means and exposed to the eye of the user only when the position of said control means indicates the absence of film in said chamber means.

10. In a camera, a housing defining a window and film-accommodating chamber means and including a wall movable between open and closed positions to respectively afford and prevent access to said chamber means; film transporting means engageable with and arranged to advance a properly inserted film through distances corresponding to the length of a film frame; and a frame counter including an indicator movable from a starting position to a plurality of additional positions each of which is indicative of a different number of exposures, means for returning said indicator to starting position in response to movement of said wall to open position, motion transmitting means normally engaged with said transporting means and operative to move said indicator from starting position to consecutive additional positions on repeated operation of said transporting means, movable control means normally tending to disengage said motion transmitting means from said transporting means, guide means provided on said wall and arranged to support a portion of properly inserted film in such position that, on movement of said wall to closed position, such film portion prevents said control means from disengaging said motion transmitting means from said transporting means, and a pair of different markers provided on said control means, one of said markers being located behind said window when the position of said control means indicates the presence and the other marker being located behind said window when the position of said control means indicates the absence of film in said chamber means.

11. In a camera, a housing defining film-accommodating chamber means and including a wall movable between open and closed positions to respectively afford and prevent access to said chamber means; film transporting means engageable with and arranged to advance a properly inserted film through distances corresponding in length to a film frame; a film frame counter including an indicator movable from a starting position to a plurality of additional positions each of which is indicative of a different number of exposures, means for automatically returning said indicator to starting position in response to movement of said wall to open position, motion transmitting means normally engaged with said transporting means and operative to move said indicator from starting position to consecutive additional positions on repeated operation of said transport means, movable control means normally tending to disengage said motion transmitting means from said transporting means, and guide means provided on said wall and arranged to support a portion of properly inserted film in such position that, on movement of said wall to closed position, such film portion prevents said control means from disengaging said motion transmitting means from said transporting means; and a trigger means movable with reference to said housing to disengage said motion transmitting means from said indicator.

12. A structure as set forth in claim 11, wherein said motion transmitting means comprises a portion which locks said trigger means on disengagement of said motion transmitting means from said transporting means.

13. In a camera, a housing defining film-accommodating chamber means and including a rear wall movable between open and closed positions to respectively afford and prevent access to said chamber means; film transporting means including a rotary sprocket engageable with the perforations of and arranged to advance a properly inserted film through distances corresponding in length to a film frame; and a film frame counter including an indicator movable from a starting position to a plurality of additional positions each of which is indicative of a different number of exposures, resilient means for automatically returning said indicator to starting position in response to movement of said rear wall to open position, motion transmitting means normally engaged with said transporting means and operative to move said indicator from starting position to consecutive additional positions on repeated operation of said transporting means, movable control means normally tending to disengage said motion transmitting means from said transporting means, and guide means provided on said rear wall and arranged to support a portion of properly inserted film in such position that, on movement of said rear wall to closed position, such film portion prevents said control means from disengaging said motion transmitting means from said transporting means.

14. A structure as set forth in claim 13, wherein said indicator is a rotary disk comprising a plurality of equidistant shorter teeth and a longer tooth, said control means comprising a pawl permanently extending into the path of an engaging said longer tooth in the starting position of said indicator, said pawl engaging consecutive shorter teeth on rotation of said indicator to said additional positions.

15. A structure as set forth in claim 14, wherein said motion transmitting means is a reciprocable bolt having a nose which engages consecutive shorter teeth and thereby rotates said indicator in response to repeated operation of said transporting means.

16. A structure as set forth in claim 15, wherein said transporting means comprises a plurality of meshing gears, a rotary actuating member coupled with one of said gears, and a cam rotatable with one of said gears and normally coupled with said bolt to shift the bolt on each rotation of said actuating member through an angle which suffices to advance the film by the length of a frame whereby the thus shifted bolt engages a shorter tooth and turns said indicator to the next additional position.

17. A structure as set forth in claim 16, wherein said cam comprises angularly spaced lobes and said bolt comprises a follower, which tracks said cam and shifts the bolt on engagement with said lobes.

18. A structure as set forth in claim 17, wherein said bolt is provided with a stop which is engaged by said control means and moves the follower away from said cam when there is no film in said chamber means.

19. In a still camera, a housing defining film-accommodating chamber means and including a wall movable between open and closed positions to respectively afford and prevent access to said chamber means; rotary film transporting means engageable with and arranged to advance a properly inserted film through distances corresponding to the length of a film frame; and a frame counter including an indicator rotatable from a starting position to a plurality of additional positions each of which is indicative of a different number of exposures, means for returning said indicator to starting position in response to movement of said wall to open position, motion transmitting means normally engaged with said transporting means and operative to rotate said indicator from starting position to consecutive additional positions on repeated operation of said transporting means, movable control means normally tending to disengage said motion transmitting means from said transporting means, and guide means provided on said wall and arranged to support a portion of properly inserted film in such position that, on movement of said wall to closed position, such film portion prevents said control means from disengaging said motion transmitting means from said transporting means.

References Cited
UNITED STATES PATENTS

| | | | |
|---|---|---|---|
| 2,539,764 | 1/1951 | Wisegarver | 95—31 |
| 2,591,417 | 4/1952 | Frye | 95—31 |
| 2,985,083 | 5/1961 | Miyasaka | 95—31 |

NORTON ANSHER, *Primary Examiner.*

R. A. SCHROEDER, *Assistant Examiner.*